(12) United States Patent
Kiyokawa et al.

(10) Patent No.: US 9,925,919 B2
(45) Date of Patent: Mar. 27, 2018

(54) PARKING ASSISTANCE DEVICE

(71) Applicant: AISIN SEIKI KABUSHIKI KAISHA, Kariya-shi, Aichi-ken (JP)

(72) Inventors: Yusuke Kiyokawa, Toyota (JP); Motokatsu Tomozawa, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 67 days.

(21) Appl. No.: 15/223,429

(22) Filed: Jul. 29, 2016

(65) Prior Publication Data

US 2017/0028914 A1     Feb. 2, 2017

(30) Foreign Application Priority Data

Jul. 31, 2015   (JP) ................................. 2015-152792

(51) Int. Cl.
*B60Q 9/00*      (2006.01)
*B62D 15/02*     (2006.01)
(Continued)

(52) U.S. Cl.
CPC ............ *B60Q 9/005* (2013.01); *B60Q 9/006* (2013.01); *B62D 15/028* (2013.01);
(Continued)

(58) Field of Classification Search
CPC ........ B60Q 9/005; B60Q 9/006; B62D 15/28; B62D 15/0285; G01C 21/3415; G01C 21/3629; G01C 21/365; G08G 1/168
See application file for complete search history.

(56) References Cited

U.S. PATENT DOCUMENTS 7,739,046 B2     6/2010   Satonaka et al.
2001/0030688 A1* 10/2001  Asahi .................... B60Q 9/005
                                                   348/118
(Continued)

FOREIGN PATENT DOCUMENTS

DE     102008027779 A1    12/2009
DE     102010061904 A1     5/2012
(Continued)

OTHER PUBLICATIONS

Communication dated Dec. 23, 2016, from the European Patent Office in counterpart European Application No. 16181839.8.

*Primary Examiner* — Calvin Cheung
(74) *Attorney, Agent, or Firm* — Sughrue Mion, PLLC

(57) ABSTRACT

A parking assistance device includes: an obstacle detection unit detecting an obstacle; a target position determination unit determining a target position between a first virtual obstacle, based on a first obstacle, and a second virtual obstacle based on a second obstacle being lined up with the first obstacle in a first direction; and a route determination unit determining a first route from the position of a vehicle to the target position, and that, when while the vehicle travels along the determined first route, the obstacle detection unit has detected a third obstacle positioned between the first and second obstacles and closer to the first obstacle than the second obstacle, enlarges the first virtual obstacle, and determines a second route that avoids the enlarged first virtual obstacle and is set from the position of the vehicle to the target position.

5 Claims, 15 Drawing Sheets

(51) Int. Cl.
*G08G 1/16* (2006.01)
*G01C 21/34* (2006.01)
*G01C 21/36* (2006.01)

(52) U.S. Cl.
CPC ..... *B62D 15/0285* (2013.01); *G01C 21/3415* (2013.01); *G01C 21/365* (2013.01); *G01C 21/3629* (2013.01); *G08G 1/168* (2013.01)

(56) References Cited

U.S. PATENT DOCUMENTS

| | | | | |
|---|---|---|---|---|
| 2007/0076526 A1* | 4/2007 | Aikyo | ................ | G01S 15/003 367/128 |
| 2007/0132563 A1* | 6/2007 | Balbale | ................ | B60Q 9/004 340/435 |
| 2008/0077294 A1* | 3/2008 | Danz | ................ | B62D 15/027 701/41 |
| 2009/0118900 A1* | 5/2009 | Adachi | ................ | B62D 15/027 701/33.4 |
| 2009/0278709 A1* | 11/2009 | Endo | ................ | B62D 15/027 340/932.2 |
| 2010/0283632 A1* | 11/2010 | Kawabata | ................ | B62D 15/027 340/932.2 |
| 2010/0289634 A1* | 11/2010 | Ikeda | ................ | B60Q 9/005 340/441 |
| 2011/0087406 A1* | 4/2011 | Barth | ................ | B62D 15/027 701/41 |
| 2011/0093168 A1* | 4/2011 | Barth | ................ | B62D 15/028 701/41 |
| 2011/0273310 A1* | 11/2011 | Kadowaki | ................ | B62D 15/0285 340/932.2 |
| 2012/0197492 A1* | 8/2012 | Schneider | ................ | B62D 15/028 701/41 |
| 2013/0124041 A1* | 5/2013 | Belser | ................ | B60W 30/095 701/41 |
| 2015/0138011 A1* | 5/2015 | Hiramaki | ................ | G01S 13/931 342/118 |
| 2015/0179075 A1* | 6/2015 | Lee | ................ | G08G 1/165 340/932.2 |
| 2015/0344028 A1* | 12/2015 | Gieseke | ................ | B60W 30/00 701/1 |
| 2015/0375742 A1* | 12/2015 | Gebert | ................ | B62D 15/027 701/23 |
| 2016/0257343 A1* | 9/2016 | Freistadt | ................ | B62D 15/0285 |
| 2016/0280263 A1* | 9/2016 | Mori | ................ | B62D 15/027 |

FOREIGN PATENT DOCUMENTS

| | | |
|---|---|---|
| JP | 2006-193014 A | 7/2006 |
| JP | 2015-152792 | 7/2015 |
| WO | 2014/125810 A1 | 8/2014 |

\* cited by examiner

PARKING ASSISTANCE DEVICE

CROSS REFERENCE TO RELATED APPLICATIONS

This application is based on and claims priority under 35 U.S.C. § 119 to Japanese Patent Application 2015-152792, filed on Jul. 31, 2015, the entire contents of which are incorporated herein by reference.

TECHNICAL FIELD

An embodiment of this disclosure relates to a parking assistance device.

BACKGROUND DISCUSSION

A parking assistance device may be mounted on a vehicle to assist a driver in parking the vehicle. The parking assistance device detects obstacles such as other stopped vehicles, and determines a route along which the vehicle is capable of avoiding the obstacles and reaching a target parking position. The parking assistance device assists the driver in parking the vehicle based on the route.

An example of related art includes JP 2006-193014A.

The parking assistance device detects obstacles via various sensors. The sensors may not be able to detect the position of an obstacle in advance depending on the position, size, and shape of the obstacle. If the vehicle moves along a route determined by the parking assistance device in this state, there is a possibility that the vehicle approaches the obstacle.

SUMMARY

A parking assistance device according to an aspect of this disclosure includes an obstacle detection unit; a target position determination unit; and a route determination unit. The obstacle detection unit detects an obstacle. The target position determination unit determines a target position between a first virtual obstacle, which is based on a first obstacle detected by the obstacle detection unit, and a second virtual obstacle which is based on a second obstacle that is detected by the obstacle detection unit and is lined up with the first obstacle in a row in a first direction. The route determination unit determines a first route from the position of a vehicle to the target position when assisting a driver in parking the vehicle in a parking area, and in a case where while the vehicle travels along the determined first route, the obstacle detection unit has detected a third obstacle which is positioned between the first obstacle and the second obstacle and is closer to the first obstacle than the second obstacle, the route determination unit enlarges the first virtual obstacle toward the target position in the first direction, and determines a second route that avoids the enlarged first virtual obstacle and is set from the position of the vehicle to the target position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed. The configuration of the embodiment described hereinafter and actions, results, and effects brought by the configuration are merely examples. This disclosure can also be realized by a configuration other than the configuration disclosed in the embodiment described hereinafter. At least one of various effects and derivative effects based on the basic configuration can be obtained.

For example, a vehicle 1 in the embodiment may be a vehicle equipped with an internal combustion engine (not illustrated) as a drive source, that is, may be an internal combustion engine vehicle. The vehicle 1 may be a vehicle equipped with an electric motor (not illustrated) as a drive source, that is, may be an electric vehicle, a fuel cell vehicle, or the like. The vehicle 1 may be a hybrid vehicle equipped with both an internal combustion engine and an electric motor as drive sources. Alternatively, the vehicle 1 may be a vehicle equipped with another drive source. Various transmissions can be mounted on the vehicle 1. Various devices such as systems or components required to drive an internal combustion engine or an electric motor can be mounted on the vehicle 1. The type, number, and layout of devices relating to driving vehicle wheels 3 of the vehicle 1 can be set in various forms.

Figure 1:
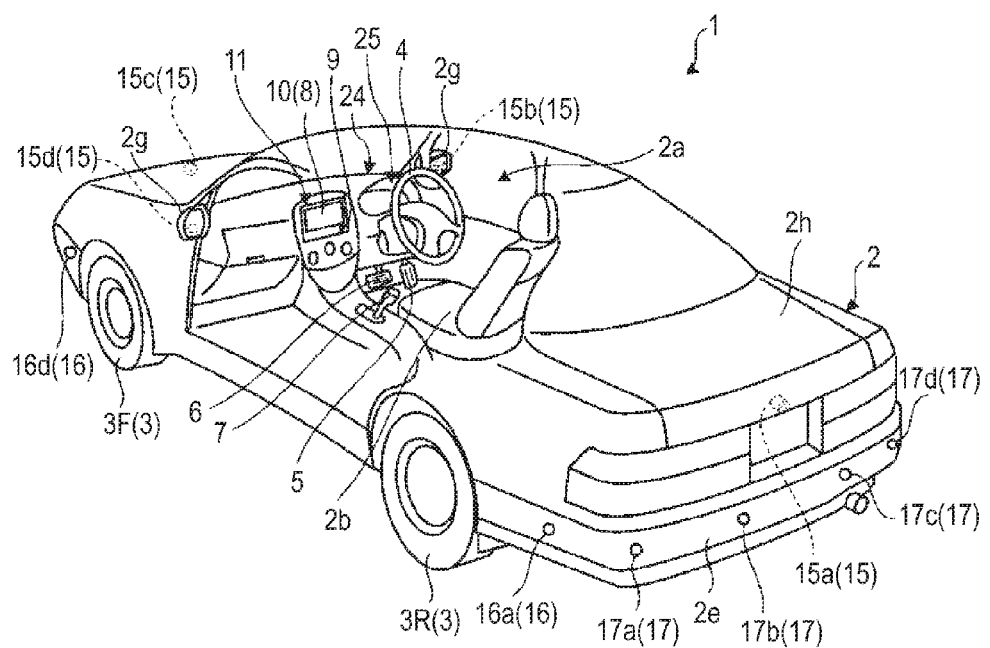
FIG. 1 is an exemplary perspective view in which a portion of a passenger compartment of a vehicle in an embodiment is seen in perspective.
Figure 2:
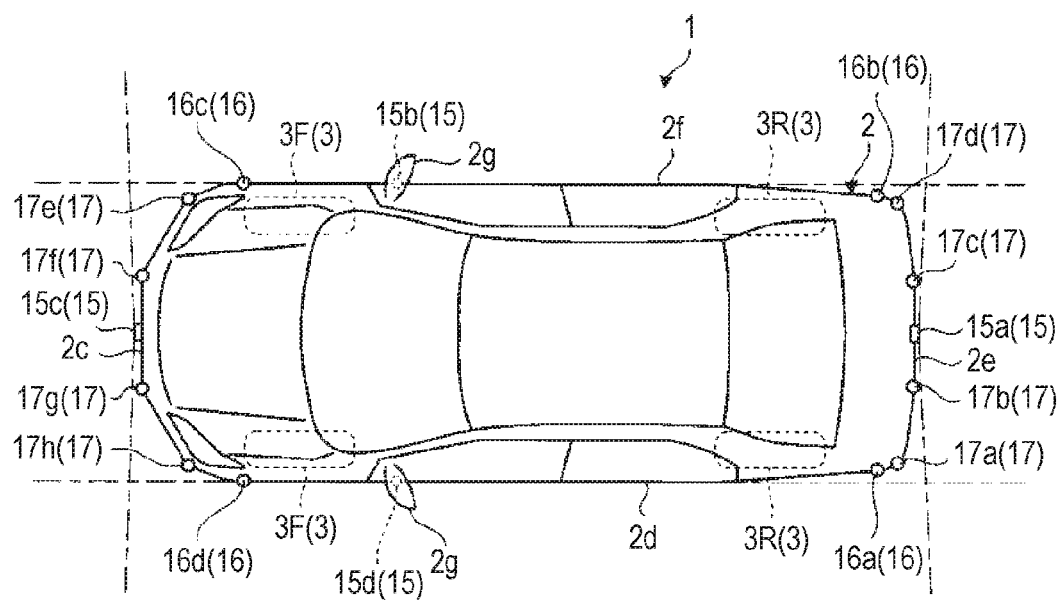
FIG. 2 is an exemplary plan view (bird's-eye view) of the vehicle in the embodiment.

FIG. 1 is an exemplary perspective view in which a portion of a passenger compartment 2a of the vehicle 1 in the embodiment is seen in perspective. FIG. 2 is an exemplary plan view (bird's-eye view) of the vehicle 1 in the embodiment. As illustrated in FIG. 1, a vehicle body 2 forms the passenger compartment 2a in which occupants (not illustrated) are seated. A steering section 4, an acceleration operation section 5, a brake operation section 6, a shift operation section 7, and the like are provided inside the passenger compartment 2a in a state where these sections are disposed in the vicinity of a seat 2b of a driver who is an occupant.

For example, the steering section 4 is a steering wheel that protrudes from a dashboard 24. The acceleration operation section 5 is an accelerator pedal positioned under the feet of the driver. The brake operation section 6 is a brake pedal positioned under the feet of the driver. The shift operation section 7 is a shift lever that protrudes from a center console. The steering section 4, the acceleration operation section 5, the brake operation section 6, and the shift operation section 7 are not limited to those components described above.

In addition, a display device 8 which is a display output unit and a voice output device 9 which is a voice output unit are provided inside the passenger compartment 2a. The display device 8 is a liquid crystal display (LCD), an organic electroluminescence display (OELD), or the like. The voice output device 9 is a speaker or the like. The display device 8 is covered with a transparent operation input unit 10 such as a touch panel.

An occupant can observe an image displayed on a display screen of the display device 8 via the operation input unit 10. An occupant can execute an input operation by touching, pressing or moving a portion of the operation input unit 10, which is positioned to correspond to an image displayed on the display screen of the display device 8, with a finger. The display device 8, the voice output device 9, the operation input unit 10, and the like are provided in a monitor device 11 that is positioned in a central portion of the dashboard 24 in a lateral direction of the vehicle, that is, a rightward and leftward direction.

The monitor device 11 may include operation input units (not illustrated) such as switches, dials, joysticks, and pressable buttons. A voice output device (not illustrated) may be provided inside the passenger compartment 2a at a position different from the position of the monitor device 11. The voice output device different from the voice output device 9 of the monitor device 11 may output voices. The monitor device 11 can be also used as a navigation system, an audio system, or the like. A display device 12 which is different from the display device 8 is provided inside the passenger compartment 2a.

Figure 3:
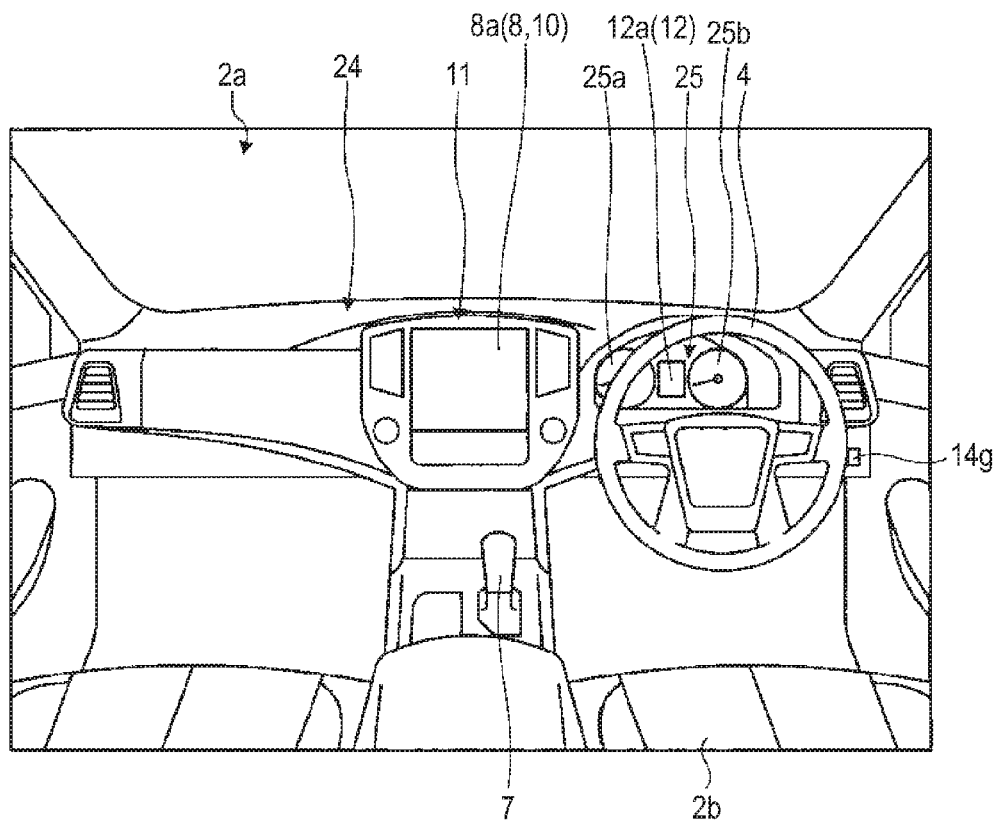
FIG. 3 is a view illustrating an example of a dashboard of the vehicle in the embodiment which is seen from the rear side of the vehicle.

FIG. 3 is a view illustrating an example of the dashboard 24 of the vehicle 1 in the embodiment which is seen from the rear side of the vehicle 1. As illustrated in FIG. 3, the display device 12 is provided in an instrument panel section 25 of the dashboard 24, and is positioned between a speed display section 25a and a rotational speed display section 25b at substantially the center of the instrument panel section 25. The size of a screen 12a of the display device 12 is smaller than the size of a screen 8a of the display device 8. The display device 12 is capable of displaying images indicating information mainly regarding assisting the driver in parking the vehicle 1. The amount of information displayed on the display device 12 may be less than the amount of information displayed on the display device 8. The display device 12 is a LCD, an OELD, or the like. The display device 8 may display information that has been displayed on the display device 12.

As illustrated in FIGS. 1 and 2, for example, the vehicle 1 is a four wheel drive vehicle, and includes two right and left front wheels 3F, and two right and left rear wheels 3R. The four vehicle wheels 3 are configured such that any one of the four vehicle wheels 3 can be turned.

Figure 4:
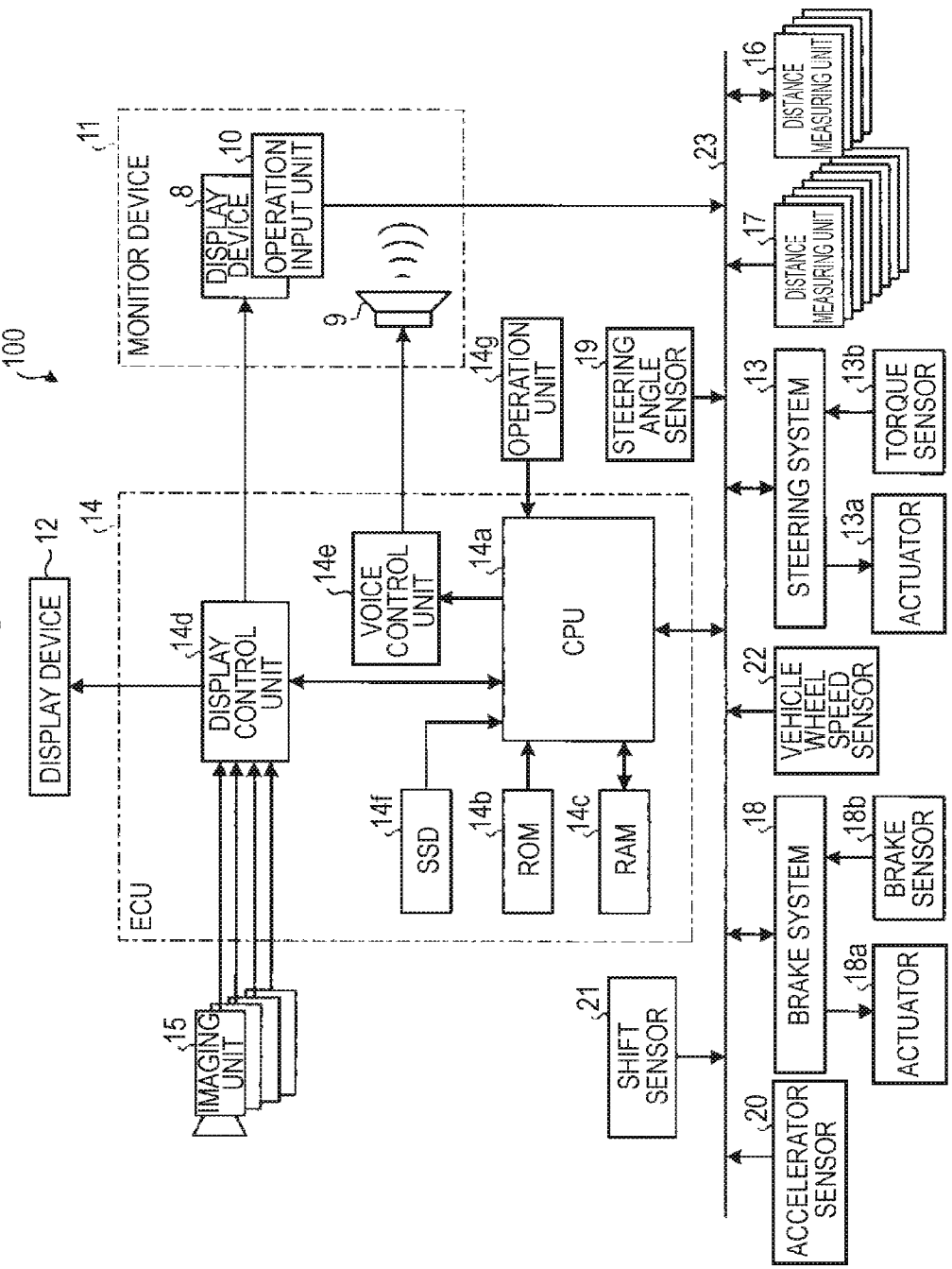
FIG. 4 is an exemplary block diagram of the configuration of a parking assistance system in the embodiment.

FIG. 4 is an exemplary block diagram of the configuration of a parking assistance system 100 in the embodiment. As illustrated in FIG. 4, the vehicle 1 includes the parking assistance system 100. The parking assistance system 100 is an example of a parking assistance device.

As illustrated in FIG. 4, the vehicle 1 includes a steering system 13 that steers at least two vehicle wheels 3. The steering system 13 includes an actuator 13a and a torque sensor 13b.

The steering system 13 is electrically controlled by an electronic control unit (ECU) 14 or the like such that the actuator 13a is operated. The steering system 13 is an electric power steering system, a steer by wire (SBW) system, or the like. The steering system 13 complements a steering force by adding torque, that is, assisted torque to the steering section 4 using the actuator 13a, or turns the vehicle wheels 3 using the actuator 13a. In this case, the actuator 13a may turn one vehicle wheel 3, or may steer a plurality of the vehicle wheels 3. For example, the torque sensor 13b detects torque that is applied to the steering section 4 by the driver.

As illustrated in FIG. 2, for example, four imaging units 15a to 15d which are a plurality of imaging units 15 are provided on the vehicle body 2. Each of the imaging units 15 is a digital camera with a built-in imaging element such as a charge coupled device (CCD) or a CMOS image sensor (CIS). Each of the imaging units 15 is capable of outputting moving image data at a predetermined frame rate. Each of the imaging units 15 includes a wide-angle lens and a fish-eye lens, and for example, is capable of capturing an image of a surrounding area in a range of 140° to 190° in a horizontal direction. The optical axis of each of the imaging units 15 is set to extend obliquely downward. Accordingly, each of the imaging units 15 sequentially captures images of an external environment around the vehicle body 2, which contains road surfaces on which the vehicle 1 is capable of moving, or areas where the vehicle 1 can be parked, and each of the imaging units 15 outputs captured image data.

For example, the imaging unit 15a is positioned at a rear end portion 2e of the vehicle body 2, and is provided on a lower wall portion of a door 2h of a rear trunk. For example, the imaging unit 15b is positioned at a right end portion 2f of the vehicle body 2, and is provided on a right rear view mirror 2g. For example, the imaging unit 15c is positioned at an end portion 2c on the front side of the vehicle body 2, that is, the front side of the vehicle body 2 in a forward and rearward direction of the vehicle, and is provided on a front bumper or the like. For example, the imaging unit 15d is positioned at an end portion 2d on the left side of the vehicle body 2, that is, the left side of the vehicle body 2 in the lateral direction of the vehicle, and is provided on a left rear view mirror 2g which is a protrusion.

The ECU 14 is capable of generating a wider angle image, or generating a virtual bird's-eye view image of the vehicle 1, which is viewed from the top, by executing computational processes or image processing of image data obtained by the plurality of imaging units 15. A bird's-eye view image is referred to as a planar image. The ECU 14 identifies stall lines or the like, which are marked on road surfaces around the vehicle 1, in images captured by the imaging units 15, and detects (extracts) parking stalls marked by stall lines.

As illustrated in FIGS. 1 and 2, for example, four distance measuring units 16a to 16d and eight distance measuring units 17a to 17h which are a plurality of distance measuring units 16 and 17 are provided on the vehicle body 2. For example, the distance measuring units 16 and 17 are sonars that emit ultrasonic waves and capture reflected waves. A sonar is also referred to as a sonar sensor or an ultrasonic detector. The ECU 14 is capable of identifying the presence of an object such as an obstacle positioned around the vehicle 1, and measuring the distance from the vehicle 1 to the object, based on results of detection by the distance measuring units 16 and 17. That is, the distance measuring units 16 and 17 are examples of a detection unit that detects objects. For example, each of the distance measuring units 17 is used to detect an object positioned a relatively short distance away therefrom. Compared to the distance measuring units 17, each of the distance measuring units 16 is used to detect an object positioned far away therefrom, that is, positioned a relatively long distance therefrom. The distance measuring units 17 are used to detect objects in front and back of the vehicle 1. The distance measuring units 16 are used to detect objects besides the vehicle 1.

As illustrated in FIG. 4, in the parking assistance system 100, in addition to the ECU 14, the monitor device 11, the steering system 13, the distance measuring units 16 and 17, and the like, a brake system 18, a steering angle sensor 19, an accelerator sensor 20, a shift sensor 21, and a vehicle wheel speed sensor 22 are electrically connected to each other via an in-vehicle network 23 which is a telecommunication line.

For example, the in-vehicle network 23 is configured as a controller area network (CAN). The ECU 14 is capable of controlling the steering system 13, the brake system 18, or the like by sending control signals via the in-vehicle network 23 thereto. Via the in-vehicle network 23, the ECU 14 is capable of receiving results of detection by the torque sensor 13b, the brake sensor 18b, the steering angle sensor 19, the distance measuring units 16, the distance measuring units 17, the accelerator sensor 20, the shift sensor 21, the vehicle wheel speed sensor 22, and the like, or operation signals from the operation input unit 10 and the like.

The ECU 14 includes a central processing unit (CPU) 14a; a read only memory (ROM) 14b; a random access memory (RAM) 14c; a display control unit 14d; a voice control unit 14e; a solid state drive (SSD) (flash memory) 14f; and the like.

The CPU 14a is capable of executing various computational processes and controls such as the processing of images displayed on the display devices 8 and 12, the determination of a movement target position of the vehicle 1, the computing of a movement route of the vehicle 1, a determination as to whether or not the vehicle 1 interferes with an object, automatic control of the vehicle 1, and the releasing of automatic control. The CPU 14a is capable of reading a program installed and stored in a non-volatile storage device such as the ROM 14b, and executing calculations according to the program. The RAM 14c temporarily stores various data which is used in computations performed by the CPU 14a. Among the computational processes performed by the ECU 14, the display control unit 14d mainly executes image processing of image data obtained by the imaging units 15, and the composition of image data to be displayed on the display device 8. Among the computational processes performed by the ECU 14, the voice control unit 14e mainly executes processing of voice data output from the voice output device 9. The SSD 14f is a rewritable non-volatile storage unit, and is capable of storing data even if a power supply of the ECU 14 is turned off. The CPU 14a, the ROM 14b, the RAM 14c, and the like are integrated into one package. Instead of the CPU 14a, the ECU 14 may be configured to include another logical processor such as a digital signal processor (DSP), or a logic circuit. A hard disk drive (HDD) may be provided instead of the SSD 14f. The SSD 14f and a HDD may be provided separately from the ECU 14.

The brake system 18 is an anti-lock brake system (ABS) that prevents locking of the brakes, an electronic stability control (ESC) that prevents skidding of the vehicle 1 during cornering, an electric brake system that enhances braking force (executes braking assist), a brake by wire (BBW), or the like.

The brake system 18 applies braking force to the vehicle wheels 3, and eventually to the vehicle 1 via an actuator 18a. The brake system 18 is capable of detecting locking of the brakes, slipping of the vehicle wheels 3, or signs of skidding from a difference between the rotational speeds of the right and left vehicle wheels 3, and executing various controls. For example, the brake sensor 18b is a sensor that detects the position of a movable portion of the brake operation section 6. The brake sensor 18b is capable of detecting the position of the brake pedal which is a movable portion of the brake operation section 6. The brake sensor 18b includes a displacement sensor.

The steering angle sensor 19 is a sensor that detects the amount of steering of the steering section 4 such as a steering wheel. The steering angle sensor 19 is configured to include a hall element or the like. The ECU 14 acquires the amount of steering of the steering section 4 performed by the driver, or the amount of steering of each vehicle wheel 3 during automatic steering from the steering angle sensor 19, and executes various controls. The steering angle sensor 19 detects the rotational angle of a rotating part of the steering section 4. The steering angle sensor 19 is an example of an angle sensor.

For example, the accelerator sensor 20 is a sensor that detects the position of a movable portion of the acceleration operation section 5. The accelerator sensor 20 is capable of detecting the position of the accelerator pedal which is a movable portion. The accelerator sensor 20 includes a displacement sensor.

For example, the shift sensor 21 is a sensor that detects the position of a movable portion of the shift operation section 7. The shift sensor 21 is capable of detecting the position of a lever, an arm, a button, or the like which is a movable portion of the shift operation section 7. The shift sensor 21 may include a displacement sensor, or may be configured as a switch.

The vehicle wheel speed sensor 22 is a sensor that detects the amount of rotation, or revolutions per unit time of the vehicle wheel 3. The vehicle wheel speed sensor 22 outputs the number of wheel speed pulses as a sensor value which indicates the detected revolutions. The vehicle wheel speed sensor 22 is configured to include a hall element or the like. The ECU 14 computes the amount of movement of the vehicle 1 based on the sensor value acquired from the vehicle wheel speed sensor 22, and executes various controls. In some cases, the vehicle wheel speed sensor 22 may be provided in the brake system 18. In this case, the ECU 14 acquires results of detection by the vehicle wheel speed sensor 22 via the brake system 18.

The configuration, the arrangement, and the electrical connection form of various sensors and the actuators described above are merely examples, and can be set (changed) in various forms.

In the embodiment, the ECU 14 realizes at least a portion of functions of the parking assistance device via collaboration between hardware and software (control program).

Figure 5:
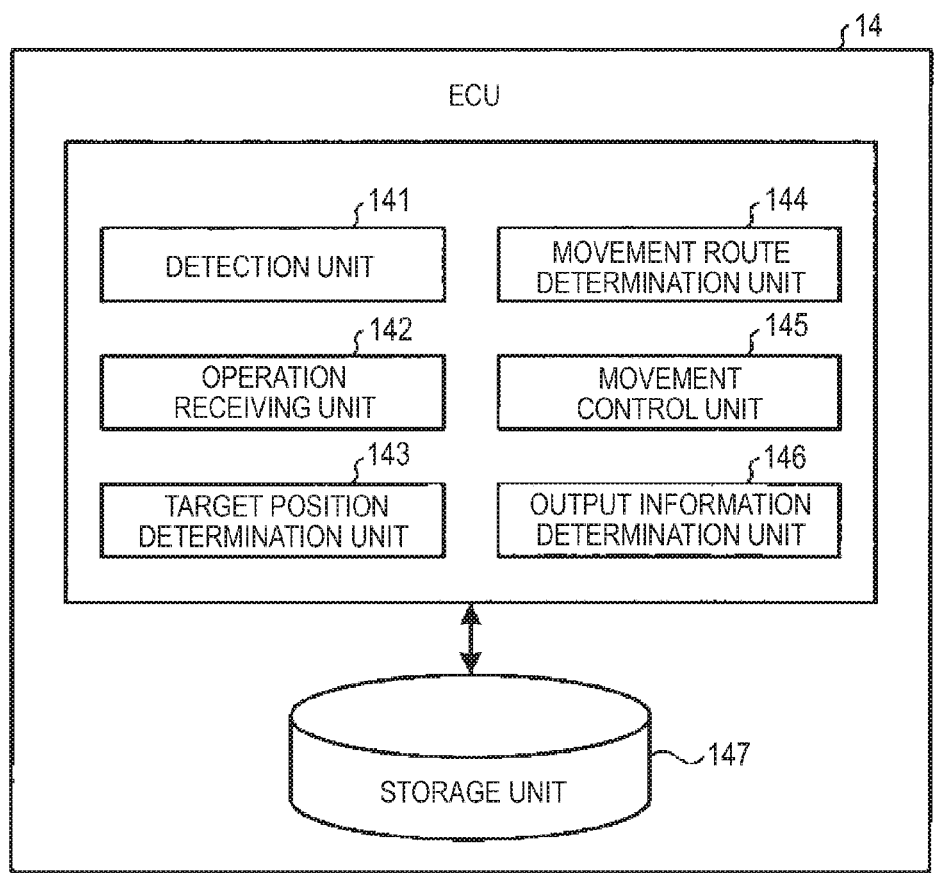
FIG. 5 is a block diagram of the functional configuration of an ECU in the embodiment.

FIG. 5 is a block diagram of the functional configuration of the ECU in the embodiment. As illustrated in FIG. 5, the ECU 14 serves as a detection unit 141, an operation receiving unit 142, a target position determination unit 143, a movement route determination unit (route determination unit) 144, a movement control unit 145, an output information determination unit 146, and a storage unit 147. The detection unit 141 is an example of an obstacle detection unit. The movement route determination unit 144 is an example of a route determination unit.

In the aforementioned configuration, the detection unit 141 detects obstacles such as other vehicles and pillars, border lines such as parking stall lines, and the like. The operation receiving unit 142 acquires operation signals generated by an input operation of an operation unit 14g. The operation unit 14g is a pressable button, a switch, or the like, and outputs operation signals. The target position determination unit 143 determines a movement target position (target parking position) of the vehicle 1. The movement route determination unit 144 determines a movement route of the vehicle 1 to a movement target position. The movement control unit 145 controls each part of the vehicle 1 such that the vehicle 1 moves to a movement target position (target parking position) along a movement route. The output information determination unit 146 determines information output from the display devices 12 and 8, the voice output device 9, and the like, and the output form of each information. The storage unit 147 stores data that is to be used in computations performed by the ECU 14, or has been calculated in computations performed by the ECU 14.

Figure 6:
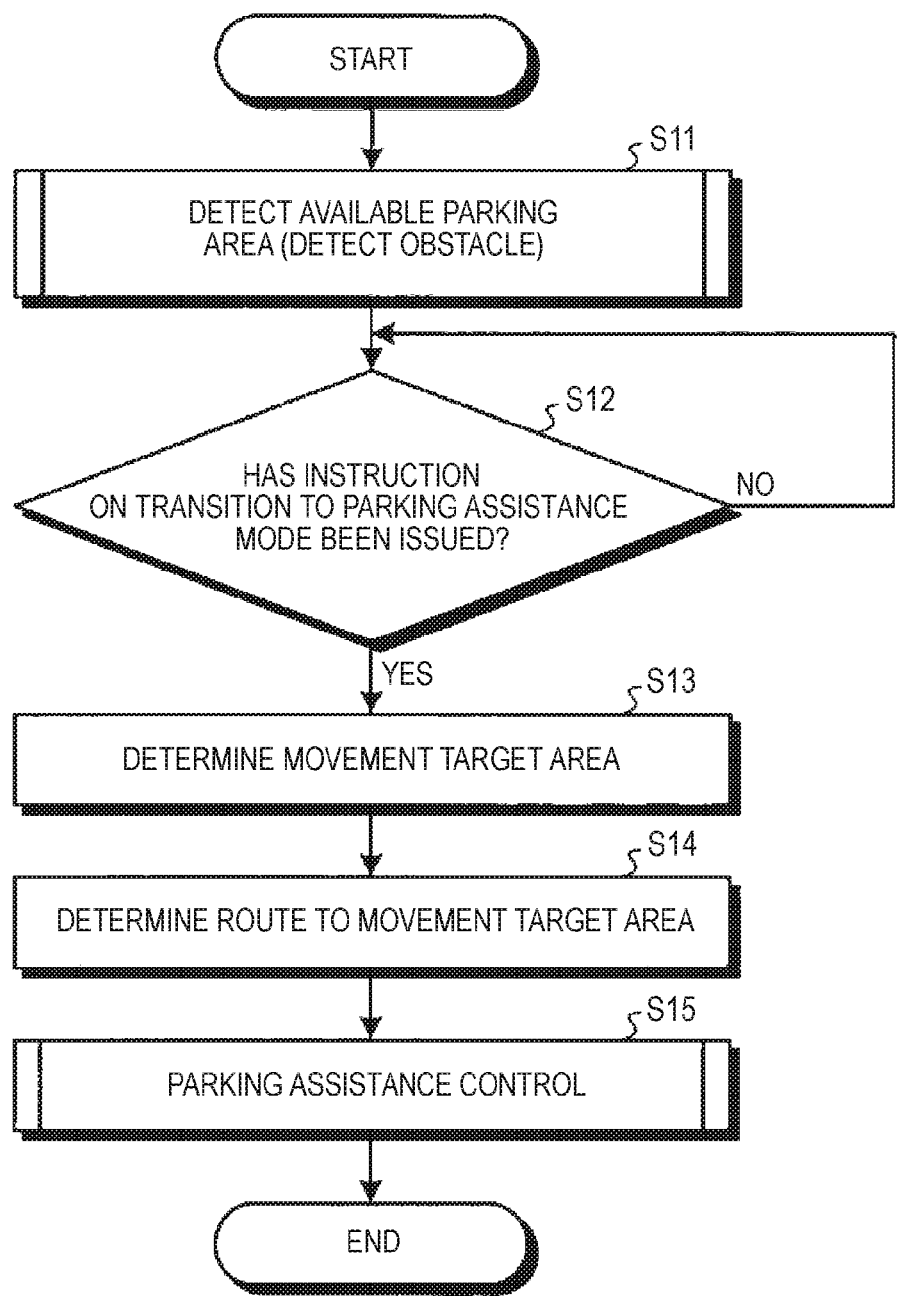
FIG. 6 is a flowchart outlining a process in the embodiment.

Hereinafter, an example of the operation of the parking assistance system 100 in the embodiment will be described. The operation of the parking assistance system 100 is not limited to an operation which will be described hereinafter. FIG. 6 is a flowchart outlining a process in the embodiment.

Figure 7:
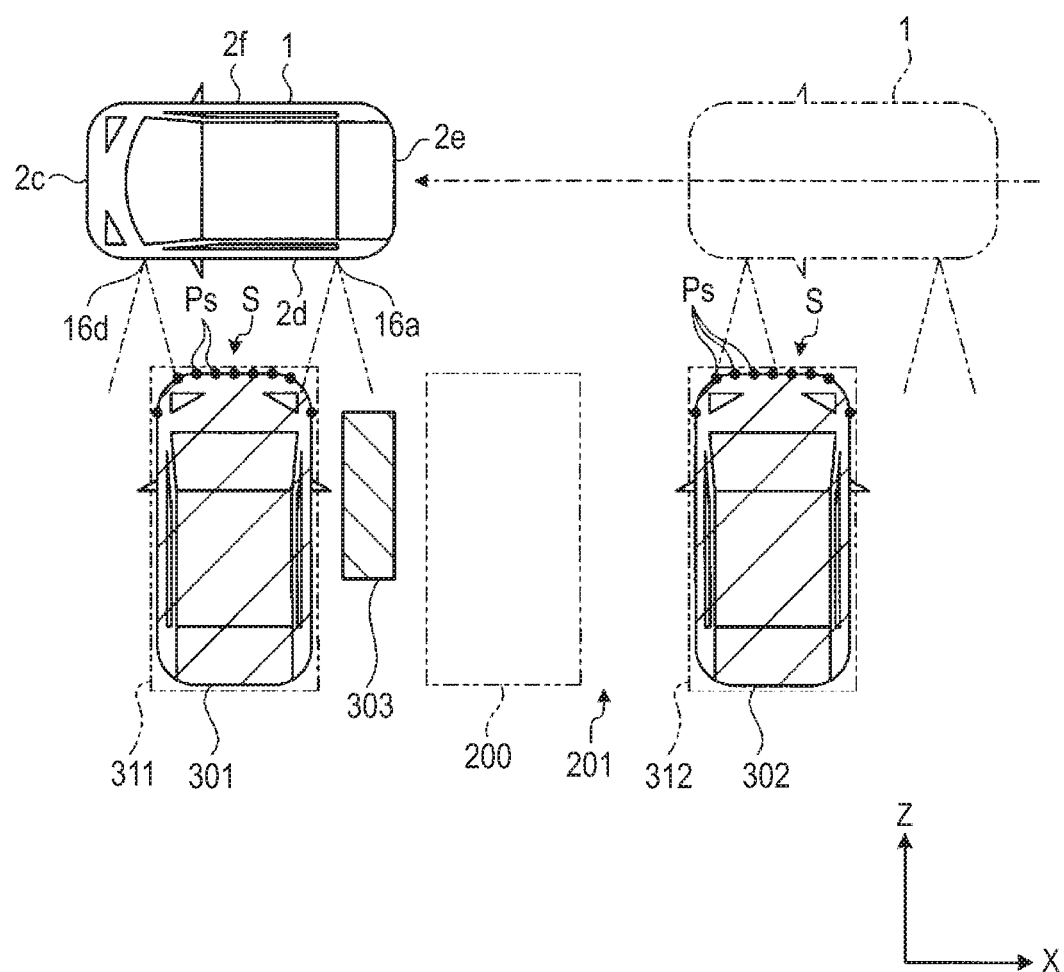
FIG. 7 is a plan view illustrating the detection of available parking areas in the embodiment.

As illustrated in FIG. 6, first, the ECU 14 detects available parking areas (detects obstacles) (S11). FIG. 7 is a plan view illustrating the detection of available parking areas in the embodiment. As illustrated in FIG. 7, the distance measuring units 16a to 16d calculate the distances to obstacles such as other vehicles 301 and 302 at predetermined sampling timings, and output the calculated distances as data that corresponds to reflective portions S (each of which is an aggregation of reflection points Ps at which sound waves or the like are reflected) of the obstacles. For example, the RAM 14c stores the output data at output intervals. The other vehicle 301 is an example of a first obstacle, and the other vehicle 302 is an example of a second obstacle.

The ECU 14 serves as the detection unit 141 to independently detect available parking areas 201 positioned on both the right and the left sides of the vehicle 1, based on the output data of the distance measuring units 16a to 16d. Hereinafter, for purpose of easy understanding, a method of detecting an available parking area 201 on the left side of the vehicle 1 will be described.

If output data corresponding to an obstacle has been output for a first predetermined length of time or longer, and thereafter, output data corresponding to the non-presence of an obstacle having the minimum required width of a parking area available for the vehicle 1 (including a case in which the distance to the obstacle is greater than or equal to a length in the forward and rearward direction of the vehicle, which is required to park the vehicle) has been output for a second predetermined length of time or longer, the detection unit 141 determines that the available parking area 201 is present.

The detection unit 141 may detect parking stall lines such as white lines which are provided on a traveling surface such as the ground or a road surface, based on captured image data output from the imaging unit 15a that captures images of the rear side of the vehicle 1. For example, the detection unit 141 detects parking stall lines by performing edge extraction on captured image data that is output from the imaging units 15a to 15d during backward movement, forward movement, or stopping of the vehicle 1.

The detection of available parking areas will be specifically exemplified with reference to FIG. 7. For example, the vehicle 1 passes in front of the other vehicles 301 and 302 which are perpendicularly parked. At this time, sound waves or the like emitted by the distance measuring units 16a and 16d are reflected by a plurality of the reflection points P of each of the other vehicles 301 and 302. The distance measuring units 16a to 16d calculate the distances to the other vehicles 301 and 302 based on the sound waves or the like reflected by the reflection points Ps.

The ECU 14 serving as the detection unit 141 detects the other vehicles 301 and 302 based on data output from the distance measuring units 16a and 16d. If described in detail, the detection unit 141 detects the other vehicle 301 based on data corresponding to the reflective portion S which is an aggregation of the plurality of reflection points Ps on the other vehicle 301. In addition, the detection unit 141 detects the other vehicle 302 based on data corresponding to the reflective portion S which is an aggregation of the plurality of reflection points Ps on the other vehicle 302.

The detection unit 141 sets a first virtual obstacle 311 based on the detected other vehicle 301. In addition, the detection unit 141 sets a second virtual obstacle 312 based on the detected other vehicle 302. In FIG. 7, the first virtual obstacle 311 and the second virtual obstacle 312 are illustrated by alternate one long and two short dashes lines. The first virtual obstacle 311 and the second virtual obstacle 312 are data of the obstacles (the other vehicles 301 and 302) detected by the detection unit 141. The positions and sizes of the first virtual obstacle 311 and the second virtual obstacle 312 may be different from the positions and sizes of the other vehicles 301 and 302.

The other vehicles 301 and 302 are perpendicularly parked while being spaced away from each other in a lateral direction X. The lateral direction X is an example of a first direction, and rightward and leftward direction of the other vehicles 301 and 302. In other words, the other vehicles 301 and 302 are parked in a row in the lateral direction X. For this reason, the first virtual obstacle 311 and the second virtual obstacle 312 set by the detection unit 141 are also positioned in a row in the lateral direction X while being spaced away from each other. The available parking area 201 is an area between the first virtual obstacle 311 and the second virtual obstacle 312 in the lateral direction X.

Returning to FIG. 6, subsequently, the ECU 14 serves as the operation receiving unit 142 to determine whether an instruction on transition to a parking assistance mode has been issued via the operation unit 14g (S12). In a case where an instruction on transition to the parking assistance mode has not yet been issued via the operation unit 14g (S12: No), the operation receiving unit 142 enters a standby mode.

In a case where it is determined in S12 that an instruction on transition to the parking assistance mode has been issued via the operation unit 14g (S12: Yes), the ECU 14 serves as the target position determination unit 143 to determine a movement target area (target parking area) 200 of the vehicle 1 (S13). The movement target area 200 is an example of a parking area.

As illustrated in FIG. 7, the movement target area 200 is disposed inside the available parking area 201. In other words, the movement target area 200 is determined such that the movement target area 200 is positioned between the first virtual obstacle 311 and the second virtual obstacle 312 (between the other vehicles 301 and 302). The movement target area 200 is an area in which the vehicle 1 is accommodated when parking is complete. In a plan view, the size of the movement target area 200 is substantially the same as the occupancy space of the vehicle 1.

Figure 8:
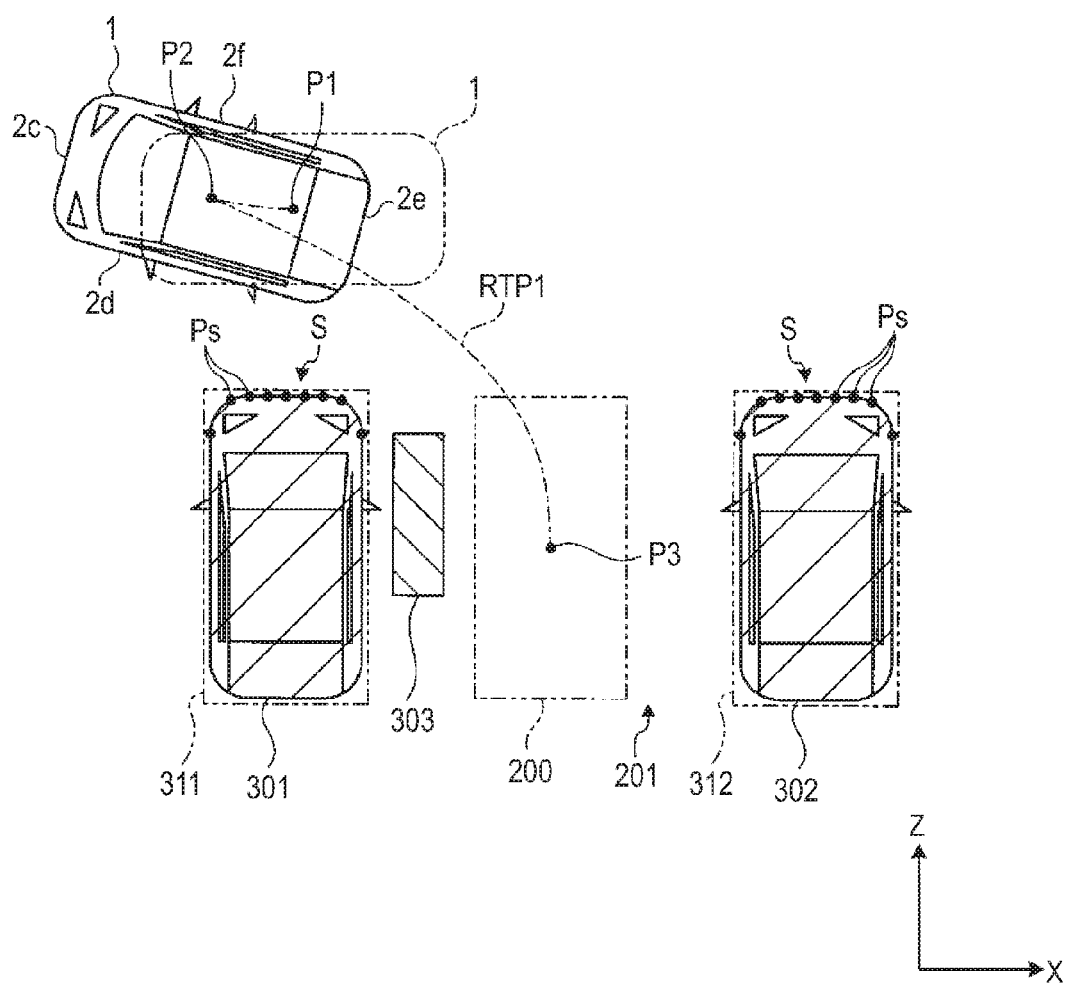
FIG. 8 is a plan view illustrating an example of the setting of a movement route in the embodiment.

Returning to FIG. 6, subsequently, the ECU 14 serves as the movement route determination unit 144 to determine a movement route of the vehicle 1 to the movement target area 200 (S14). FIG. 8 is a plan view illustrating an example of the setting of a movement route in the embodiment. Hereinafter, as illustrated in FIG. 8, a case in which a movement route contains one reverse turning position will be described. A movement route is not limited to that case. A movement route may not contain any reverse turning position, or may contain a plurality of reverse turning positions.

First, the movement route determination unit 144 determines a first movement route RTP1 from an initial position P1 when a parking assistance control process of the vehicle 1 is started, to a target parking position P3 via a reverse turning position P2. The initial position P1 is an example of the position of the vehicle. For example, the target parking position P3 is an example of a target position, and for example, is the position of the central point of the vehicle 1 when the parking of the vehicle 1 in the movement target area 200 is complete. If the target position determination unit 143 determines the movement target area 200, the target parking position P3 is determined. In FIG. 8, the vehicle 1 positioned at the initial position P1 is illustrated by an alternate one long and two short dashes line, and the vehicle 1 positioned at the reverse turning position P2 is illustrated by a solid line.

The first movement route RTP1 is formed such that a driver drives the vehicle 1 forward toward the reverse turning position P2 of the steering wheel (the steering section 4) while turning the steering wheel (the steering section 4) right by a predetermined amount, stops the vehicle 1 by pressing the brakes (the brake operation section 6) at the reverse turning position P2, changes a gear position to a reverse position, and turns the steering wheel (the steering section 4) left toward the target parking position P3. For example, the first movement route RTP1 is a route that contains an arc, a clothoid curve, and a straight line.

Figure 9:
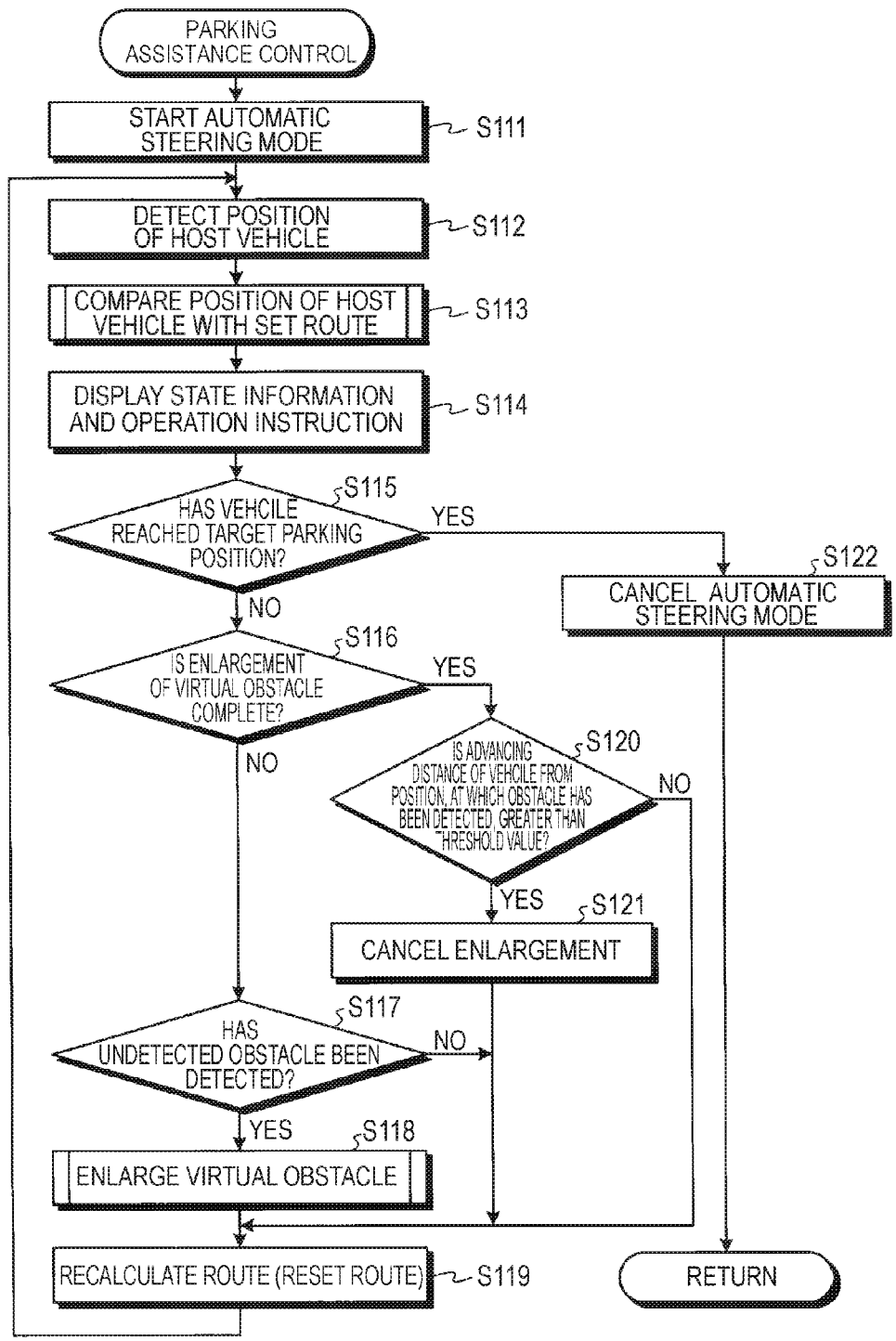
FIG. 9 is a process flowchart illustrating a parking assistance control process in the embodiment.

Returning to FIG. 6, if the first movement route RTP1 is determined, the ECU 14 transits to parking assistance control (S15). FIG. 9 is a process flowchart illustrating the parking assistance control process in the embodiment.

First, the ECU 14 serves as the movement control unit 145 to start an automatic steering mode in which automatic steering is performed, so as to control each part of the vehicle 1 such that the vehicle 1 moves to the target parking position P3 of the movement target area 200 along the first movement route RTP1 (S111).

In the automatic steering mode of the embodiment, it is not necessary for the driver to operate the steering section 4, specifically, to operate the steering wheel. A forward movement drive force and a rearward movement drive force of the vehicle 1 in the parking assistance control process are generated by creeping that allows a drive force of an engine to be transmitted to the vehicle 1 even if the driver does not press the accelerator pedal, that is, does not operate the acceleration operation section 5.

For this reason, the driver merely operates the brake pedal (the brake operation section 6) and the shift lever (the shift operation section 7) according to display on the display device 12. In the automatic steering mode, the brake pedal (the brake operation section 6) and the shift lever (the shift operation section 7) may be automatically operated.

Subsequently, the ECU 14 serving as the movement control unit 145 detects the position of the host vehicle (S112). Specifically, the ECU 14 detects the position of the host vehicle by calculating the distance of the vehicle 1, which is the amount of movement from the initial position P1, and the direction of the vehicle 1 based on the amount of steering of the steering section 4 detected by the steering angle sensor 19, and a vehicle speed detected by the vehicle wheel speed sensor 22.

The ECU 14 compares the set route with the position of the host vehicle (S113). The ECU 14 serves as the output information determination unit 146 to determine information regarding the state of the vehicle and an operation instruction to the driver, and to display the state information and the operation instruction on the display device 12 (S114).

Subsequently, the ECU 14 serves as the movement control unit 145 to determine whether the position of the host vehicle has reached the target parking position P3 (S115). In a case where the position of the host vehicle has not yet reached the target parking position P3 (S115: No), the ECU 14 serving as the movement control unit 145 determines whether an enlargement process (to be described later) has been performed (S116). In the embodiment, the enlargement process has not yet been performed (S116: No), and thus, the ECU 14 serves as the detection unit 141 to determine whether an undetected obstacle has been detected (S117).

Figure 10:
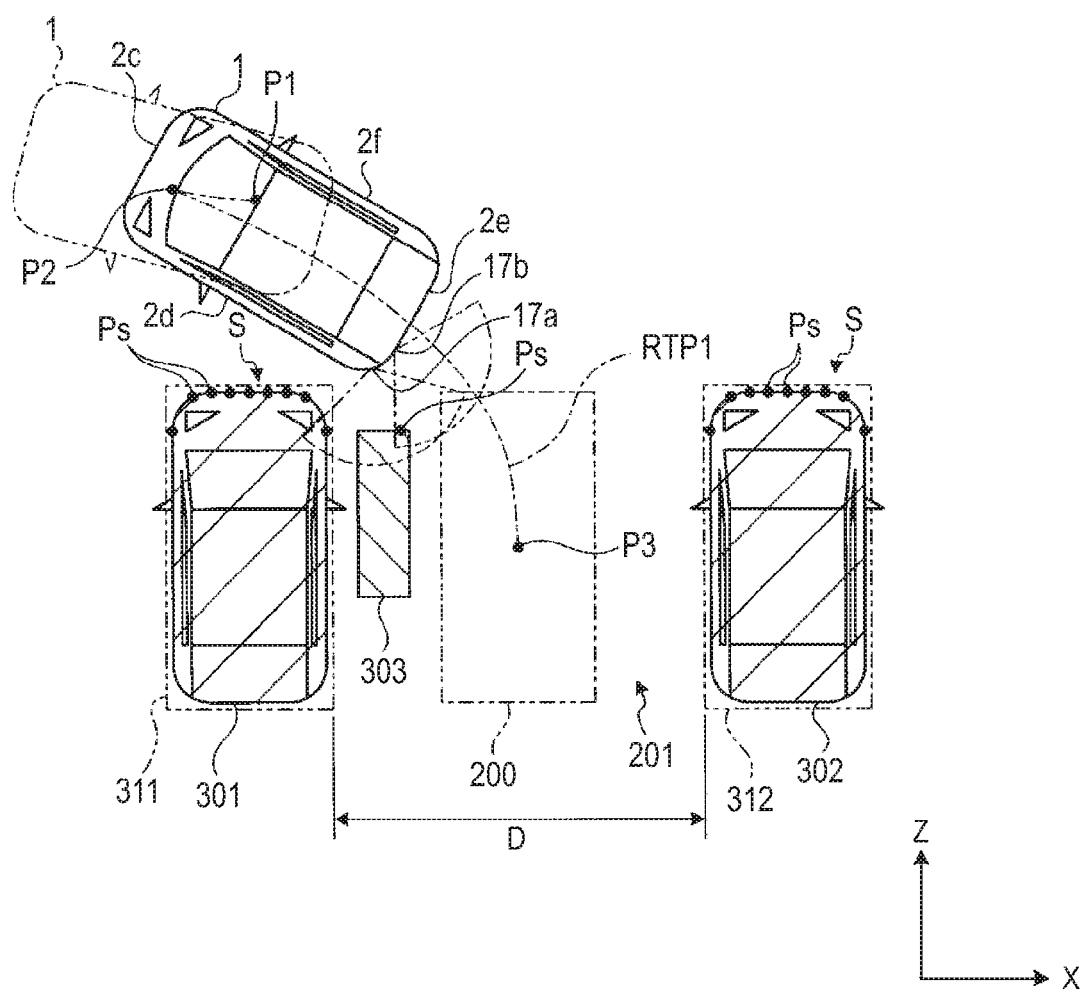
FIG. 10 is a plan view illustrating the detection of an undetected obstacle in the embodiment.

FIG. 10 is a plan view illustrating the detection of an undetected obstacle in the embodiment. As illustrated in FIG. 10, an obstacle 303 is present between the other vehicles 301 and 302. The obstacle 303 is an example of a third obstacle. The obstacle 303 is an obstacle that has not initially been detected by the detection unit 141 (S11).

For example, the obstacle 303 is a pillar which is thin in the lateral direction X.

An end portion of the obstacle 303 in a forward and rearward direction Z is positioned further away from the vehicle 1 than end portions of the other vehicles 301 and 302 in the forward and rearward direction Z. The forward and rearward direction Z is an example of a second direction, and is a direction perpendicular to the lateral direction X. The distance measuring units 16a and 16d may have difficulty detecting a relatively small obstacle and an obstacle positioned far away therefrom. For this reason, the obstacle 303 has not been detected during the detection of available parking areas in S11.

The obstacle 303 is positioned closer to the other vehicle 301 from the other vehicle 302. In addition, the obstacle 303 is positioned between the other vehicle 301 and the movement target area 200. The other vehicle 301 is closer to the initial position P1 of the vehicle 1 than the other vehicle 302. The obstacle 303 is positioned inside of (positioned close to the center) the first movement route RTP1 containing an arc and clothoid curve.

If parking assistance is activated, and the vehicle 1 travels along the first movement route RTP1 determined by the movement route determination unit 144, the vehicle 1 approaches the obstacle 303. If the vehicle 1 approaches the obstacle 303, the distance measuring units 16 and 17 of the vehicle 1 output data corresponding to the reflective portion S (the reflection points Ps) of the obstacle 303.

If exemplified in detail, when the vehicle 1 moves rearward, the reflection points Ps of the obstacle 303 reflect sound waves or the like which are emitted by one of the distance measuring units 17a and 17b disposed at the rear end portion 2e of the vehicle 1. The distance measuring units 17*a* and 17*b* calculate the distance to the obstacle 303 based on the sound waves or the like.

The detection unit 141 detects the presence and the position of the obstacle 303 based on the distances to the obstacle 303 calculated by the distance measuring units 17*a* and 17*b*. Specifically, the detection unit 141 detects the position of the obstacle 303 via triangulation based on the distance to the obstacle 303 detected by the distance measuring unit 17*a*, and the distance to the obstacle 303 detected by the distance measuring unit 17*b*.

Figure 11:
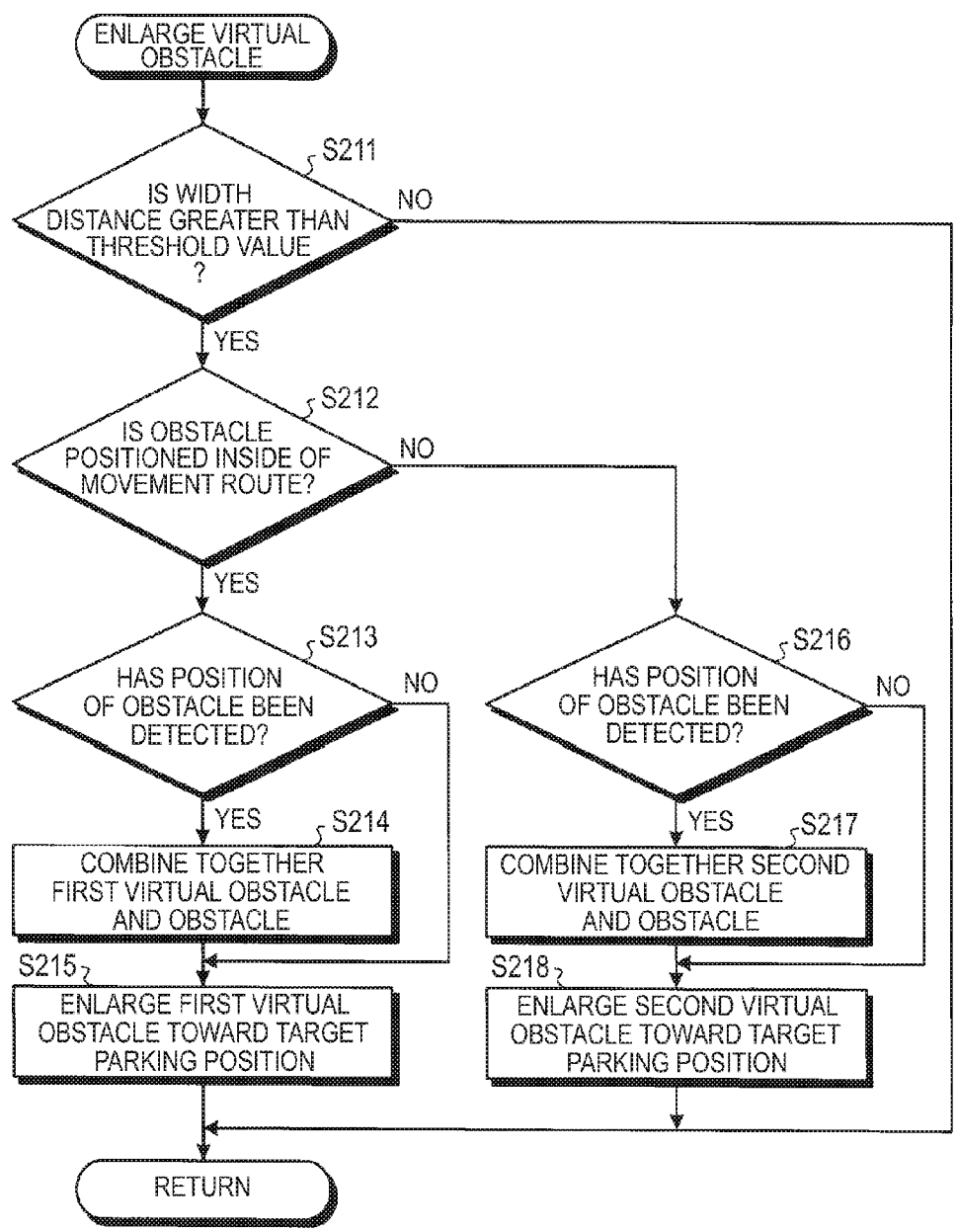
FIG. 11 is a process flowchart illustrating an enlargement process for a virtual obstacle in the embodiment.

Returning to FIG. 9, if the obstacle 303 is detected (S117: Yes), the ECU 14 enlarges a virtual obstacle (S118). FIG. 11 is a process flowchart illustrating an enlargement process for a virtual obstacle in the embodiment.

As illustrated in FIG. 11, first, the ECU 14 serves as the target position determination unit 143 to determine whether a width distance D (refer to FIG. 10) between the first virtual obstacle 311 and the second virtual obstacle 312 (between the other vehicles 301 and 302) in the lateral direction X is greater than a predetermined threshold value (S211). For example, the threshold value is a value obtained by adding a predetermined margin to the width of the vehicle 1.

In a case where the distance D is greater than the threshold value (S211: Yes), the ECU 14 serves as the detection unit 141 to determine whether the obstacle 303 is positioned inside of the first movement route RTP1 (S212). As described above, in the embodiment illustrated in FIG. 10, the obstacle 303 is positioned inside (positioned closer to the center) of the first movement route RTP1 (S212: Yes). In this case, the ECU 14 serves as the detection unit 141 to determine whether the position of the obstacle 303 has been detected (S213).

Figure 12:
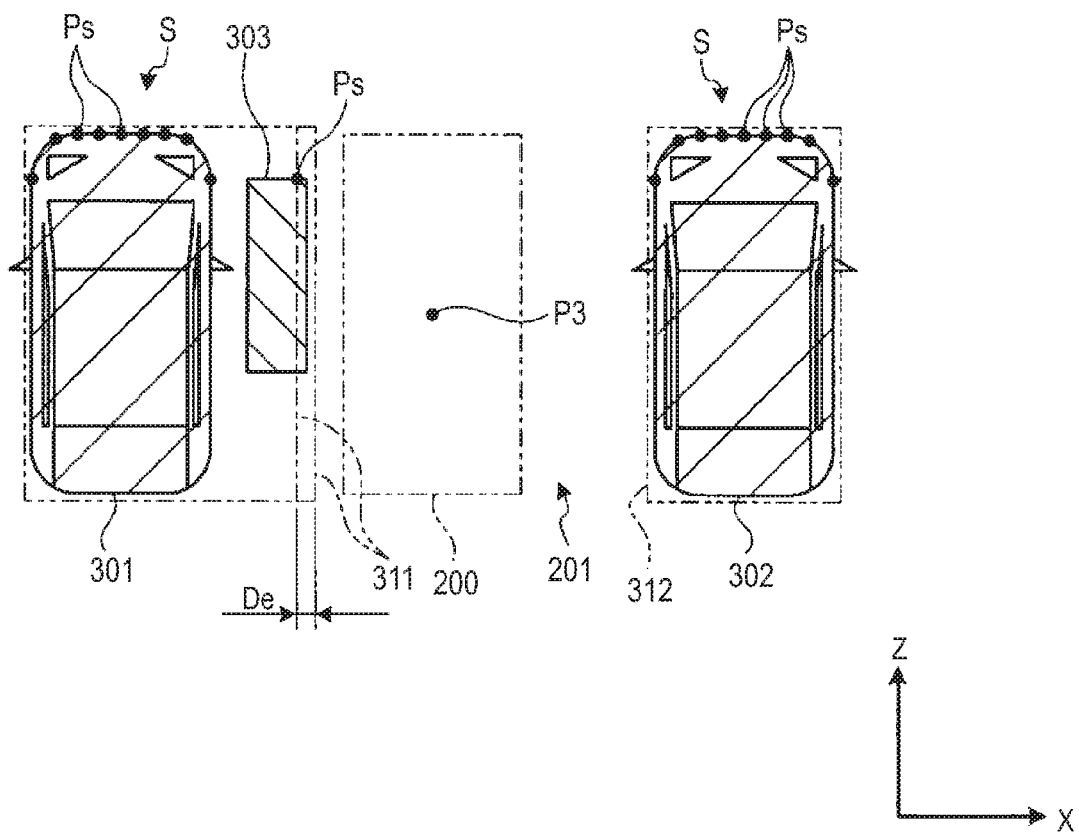
FIG. 12 is a plan view illustrating the enlargement process for the virtual obstacle in the embodiment.

As described above, the detection unit 141 in the embodiment detects the position of the obstacle 303 via the distance measuring units 17*a* and 17*b* (S213: Yes). In this case, the detection unit 141 combines together the first virtual obstacle 311 and the obstacle 303, the position of which has been detected (S214). FIG. 12 is a plan view illustrating the enlargement process for the virtual obstacle in the embodiment. In FIG. 12, the first virtual obstacle 311 and the obstacle 303 which have been combined together are illustrated by an alternate one long and two short dashes line that passes through the reflection point Ps on the obstacle 303. As illustrated in FIG. 12, since the first virtual obstacle 311 and the obstacle 303 have been combined together, the detection unit 141 assumes that the first virtual obstacle 311 also occupies an area (for example, an area up to the reflection point Ps) in the lateral direction X in which the obstacle 303 has been detected.

Returning to FIG. 11, subsequently, the ECU 14 serves as the movement route determination unit 144 to enlarge the first virtual obstacle 311 toward the target parking position P3 (S215). As illustrated in FIG. 12, the movement route determination unit 144 temporarily enlarges the first virtual obstacle 311 toward the target parking position P3 in the lateral direction X. In other words, the movement route determination unit 144 enlarges the first virtual obstacle 311 toward the target parking position P3 from the area (end portion of the combined first virtual obstacle 311) in which the obstacle 303 has been detected.

The movement route determination unit 144 enlarges the first virtual obstacle 311 a predetermined distance De. In other words, the value of an enlargement distance of the first virtual obstacle 311 is a constant. If the first virtual obstacle 311 has been enlarged, the enlargement process for the virtual obstacle is terminated.

Figure 13:
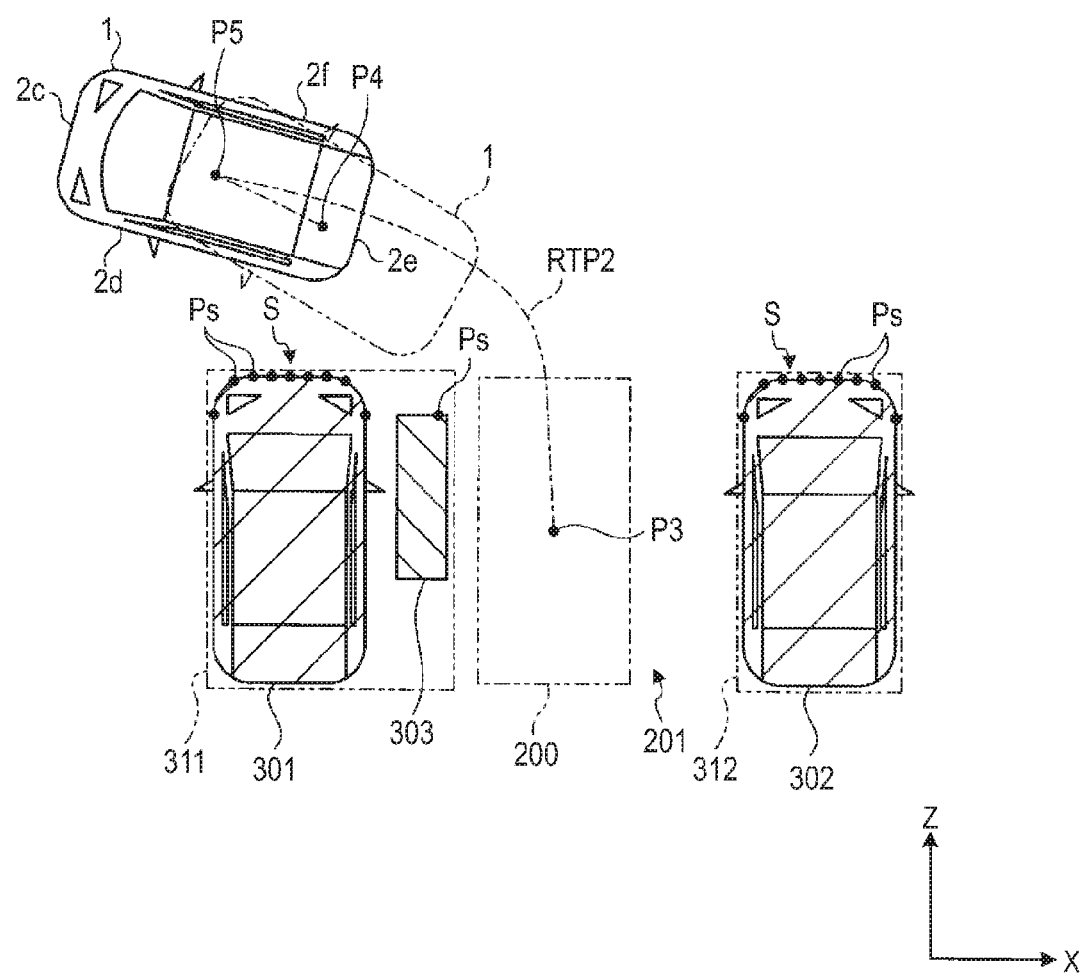
FIG. 13 is a plan view illustrating an example of the resetting of a movement route in the embodiment.

Returning to FIG. 9, if the virtual obstacle has been enlarged, the ECU 14 serves as the movement route determination unit 144 to recalculate and reset a movement route to the movement target area 200 of the vehicle 1 (S119). FIG. 13 is a plan view illustrating an example of the resetting of a movement route in the embodiment.

In the embodiment, the movement route determination unit 144 determines a second movement route RTP2 which avoids the enlarged first virtual obstacle 311 and is set from a current position P4 of the vehicle 1 to the target parking position P3 via a reverse turning position P5. The position P4 is a position at which the ECU 14 serving as the detection unit 141 has detected the obstacle 303. In other words, the position P4 is a position at which the ECU 14 serving as the movement route determination unit 144 has set a reverse turning point to trace the second movement route RTP2. The position P4 is an example of the position of the vehicle.

The second movement route RTP2 is formed such that the driver drives the vehicle 1 forward toward the reverse turning position P5 of the steering wheel (the steering section 4) while slightly turning the steering wheel (the steering section 4) left, stops the vehicle 1 by pressing the brakes (the brake operation section 6) at the reverse turning position P5, changes a gear position to a reverse position, and turns the steering wheel (the steering section 4) left toward the target parking position P3.

At least a portion of the second movement route RTP2 passes outside of (between the first movement route RTP1 and the second virtual obstacle 312) the first movement route RTP1. In other words, the second movement route RTP2 is a route that further curves around the other vehicle 301 than the first movement route RTP1.

Returning to FIG. 9, the ECU 14 causes the process to transit to S112, and then repeats the same process. That is, in an automatic steering mode, the movement control unit 145 controls each part of the vehicle 1 such that the vehicle 1 travels along the second movement route RTP2 according to various controls.

Figure 14:
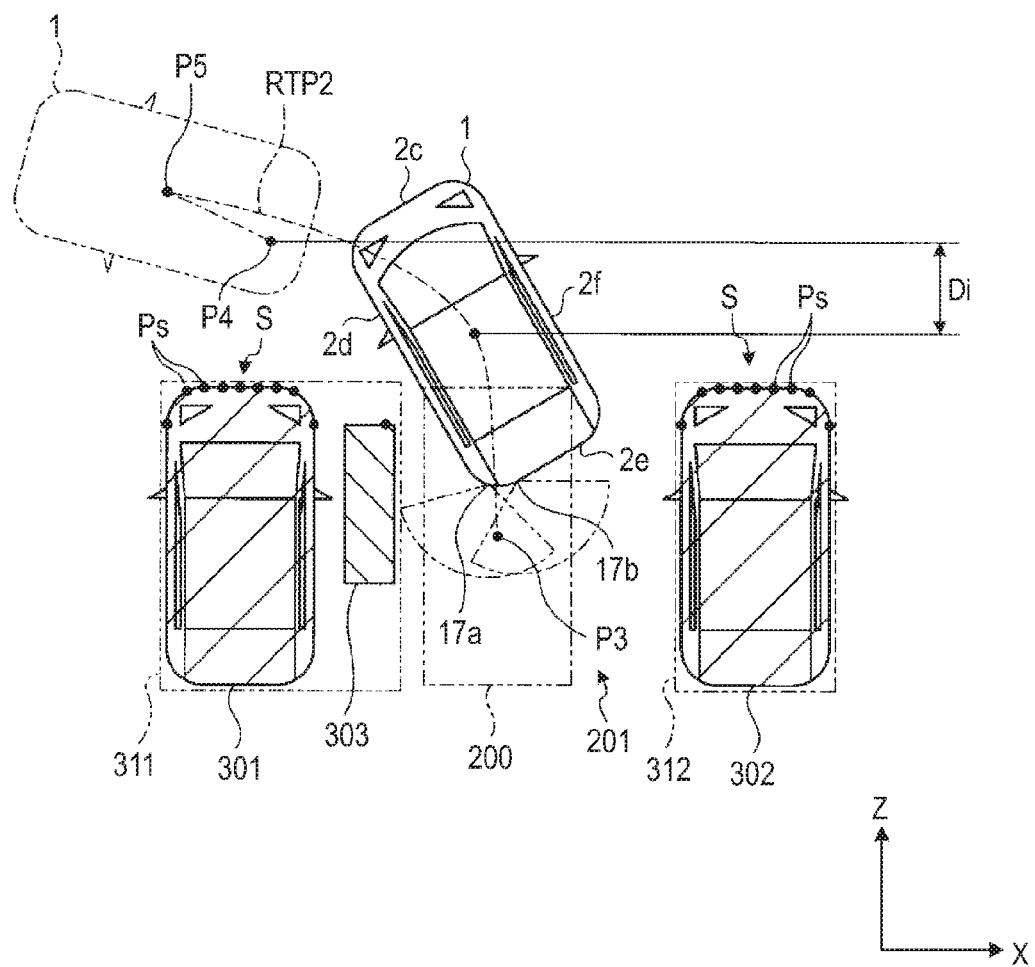
FIG. 14 is a plan view illustrating an advancing distance in the embodiment.

FIG. 14 is a plan view illustrating an advancing distance in the embodiment. As illustrated in FIG. 14, if the vehicle 1 travels along the second movement route RTP2, a portion of the vehicle 1 enters the movement target area 200. In other words, a portion of the vehicle 1 is positioned between the other vehicles 301 and 302.

In a case where the virtual obstacle has been enlarged in S116 (S116: Yes), the ECU 14 serves as the movement route determination unit 144, and determines whether the vehicle 1 has advanced a predetermined distance or longer from the position P4 at which the steering wheel has been reversely turned (S120).

For example, first, the ECU 14 serves as the movement control unit 145 to calculate the advancing distance of the vehicle 1 from the position P4, based on the detected position of the host vehicle. In the embodiment, the ECU 14 serving as the movement control unit 145 calculates a distance Di which is an advancing distance of the vehicle 1 from the position P4 in the forward and rearward direction Z. In other words, the distance Di is a distance between the position of the vehicle 1 and the position P4 at which the obstacle 303 has been detected by the ECU 14 serving as the detection unit 141.

The ECU 14 serves as the movement route determination unit 144 to compare a predetermined threshold value with the advancing distance Di of the vehicle 1 from the position P4, and to determine whether the vehicle 1 has advanced a predetermined distance or longer from the position P4. In a case where the distance Di is greater than the threshold value (S120: Yes), the ECU 14 serving as the movement route determination unit 144 cancels enlargement of the first virtual obstacle 311 or the second virtual obstacle 312 (S121). If the first virtual obstacle 311 and the second virtual obstacle 312 have not been enlarged (S120: No), the ECU 14 serves as the movement route determination unit 144, and transits to the recalculation of a movement route (S119).

Also, in a case where the obstacle 303 has not been detected in S117 (S117: No), the ECU 14 serves as the movement route determination unit 144, and transits to the recalculation of a movement route (S119).

Depending on road surface conditions or the like, the vehicle 1 does not necessarily move along a set movement route. For this reason, a movement route more optimized for actual situations is maintained by recalculating and resetting a movement route (S119).

If the vehicle 1 has reached the target parking position P3 via the parking assistance control (S115: Yes), the ECU 14 serves as the movement control unit 145 to cancel the automatic steering mode (S122). The ECU 14 serves as the output information determination unit 146 to cause the display device 12 to display a message indicating that parking assistance is complete, and to terminate the parking assistance.

In a case where the obstacle 303 is relatively small or is a circular pillar in the control of enlarging the virtual obstacle as illustrated in FIG. 11, the position of the obstacle 303 may be uncertain (S213: No). In this case, the movement route determination unit 144 temporarily enlarges the first virtual obstacle 311 toward the target parking position P3 in the lateral direction X without combining together the first virtual obstacle 311 and the obstacle 303 (S215).

In addition, the obstacle 303 may be positioned outside of (outer circumferential side) the first movement route RTP1 (S212: No). In this case, the ECU 14 serves as the detection unit 141 to determine whether the position of the obstacle 303 has been detected (S216). In this case, the other vehicle 302 is an example of the first obstacle, the other vehicle 301 is an example of the second obstacle, the second virtual obstacle 312 is an example of the first virtual obstacle, and the first virtual obstacle 311 is an example of the second virtual obstacle.

In a case where the ECU 14 serving as the detection unit 141 has detected the position of the obstacle 303 (S216: Yes), the ECU 14 combines together the second virtual obstacle 312 and the obstacle 303, the position of which has been detected (S217). Since the second virtual obstacle 312 and the obstacle 303 have been combined together, the ECU 14 serving as the detection unit 141 assumes that the second virtual obstacle 312 also occupies an area in the lateral direction X in which the obstacle 303 has been detected.

Subsequently, the ECU 14 serves as the movement route determination unit 144 to enlarge the second virtual obstacle 312 toward the target parking position P3 (S218). The ECU 14 serving as the movement route determination unit 144 virtually enlarges the second virtual obstacle 312 toward the target parking position P3 in the lateral direction X. In a case where the position of the obstacle 303 is uncertain (S216: No), the ECU 14 serving as the movement route determination unit 144 temporarily enlarges the second virtual obstacle 312 toward the target parking position P3 in the lateral direction X without combining together the second virtual obstacle 312 and the obstacle 303 (S218). If the second virtual obstacle 312 has been enlarged, the process of enlarging the virtual obstacle is terminated.

Figure 15:
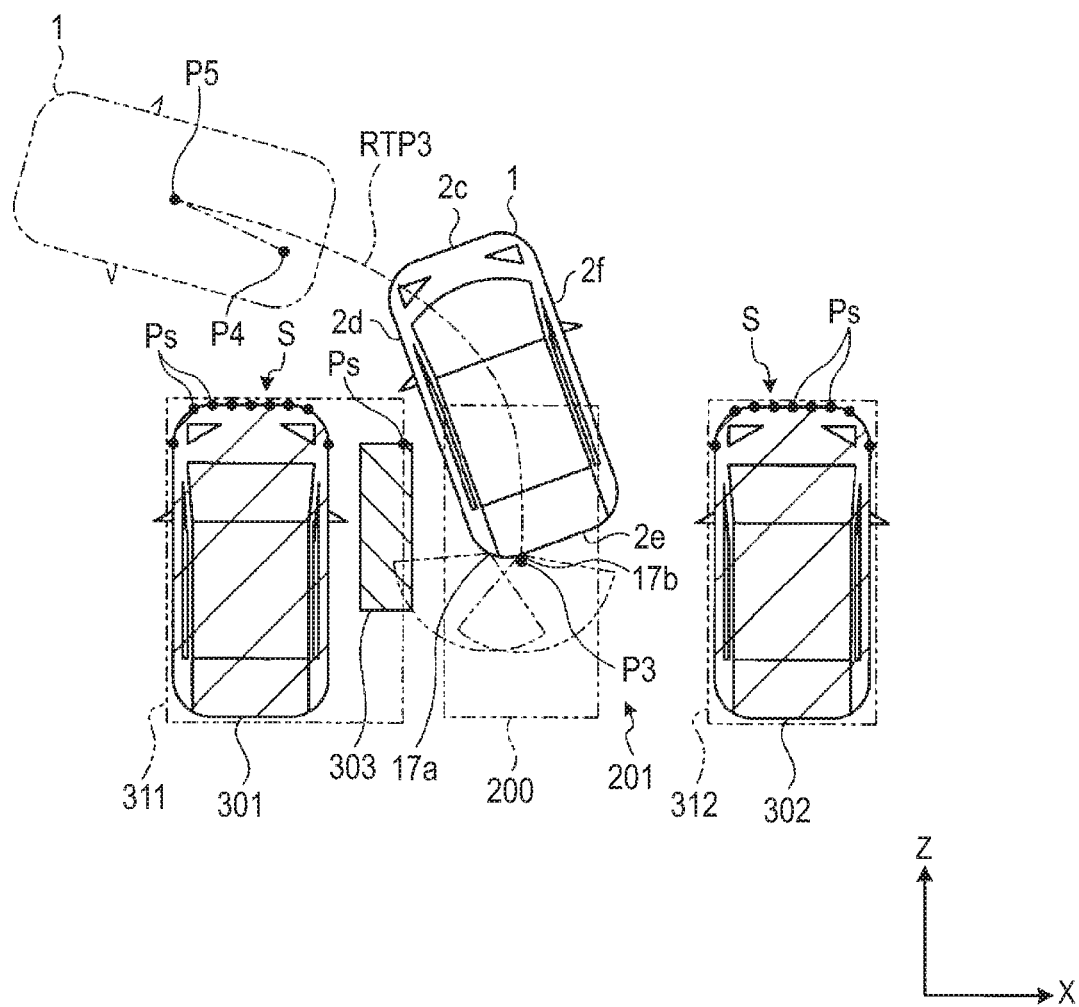
FIG. 15 is a plan view illustrating another example of the resetting of a movement route in the embodiment.

In a case where the distance D is less than the threshold value in S211 (S211: No), the process of enlarging the virtual obstacle is terminated. FIG. 15 is a plan view illustrating another example of the resetting of a movement route in the embodiment. As illustrated in FIG. 15, in a case where the obstacle 303 has been detected, but the first virtual obstacle 311 and the second virtual obstacle 312 have not been enlarged, the ECU 14 serves as the movement route determination unit 144 to determine a third movement route RTP3. The third movement route RTP3 is an example of a third route.

The third movement route RTP3 is a route which avoids a detected portion of the obstacle 303 and is set from the current position of the vehicle 1 to the target parking position P3. That is, the ECU 14 serves as the movement route determination unit 144 to determine the third movement route RTP3 that avoids the newly detected obstacle 303.

In the control of enlarging the virtual obstacle, after the second movement route RTP2 has been determined, a new obstacle which is closer to the other vehicle 302 from the other vehicle 301 may be detected. In this case, the enlargement of the first virtual obstacle 311 is cancelled, and the second virtual obstacle 312 is enlarged toward the target parking position P3. That is, one of the first virtual obstacle 311 and the second virtual obstacle 312 is enlarged.

In the parking assistance system 100 according to one embodiment, in a case where the detection unit 141 has detected the obstacle 303 while the vehicle 1 travels along the determined first movement route RTP1, the movement route determination unit 144 enlarges the first virtual obstacle 311 toward the target parking position P3 in the lateral direction X in which the other vehicles 301 and 302 are parked in a row, and determines the second movement route RTP2 which avoids the enlarged first virtual obstacle 311 and leads to the target parking position P3. Since the vehicle 1 travels along the second movement route RTP2 that is positioned further away from the obstacle 303 than the first movement route RTP1, the vehicle 1 is capable of traveling toward the target parking position P3 while avoiding the obstacle 303.

For example, in a case where the obstacle 303 is small, it is considered that the detection unit 141 detects the distance between the vehicle 1 and the obstacle 303, but may not be able to detect the position of the obstacle 303. Since the second movement route RTP2 determined by the movement route determination unit 144 is positioned further away from the other vehicle 301 than the first movement route RTP1, even if the position of the obstacle 303 is uncertain, the vehicle 1 is capable of traveling toward the target parking position P3 via reverse turning of the steering wheel while avoiding the obstacle 303.

The movement route determination unit 144 enlarges the first virtual obstacle 311 from the detected portion of the obstacle 303 toward the target parking position P3, and determines the second movement route RTP2 which avoids the enlarged first virtual obstacle 311 and leads to the target parking position P3. Since the vehicle 1 moves around the obstacle 303 along a large curve, even if an undetected portion of the obstacle 303 is larger than a detected portion of the obstacle 303 in the lateral direction X, the vehicle 1 is capable of traveling toward the target parking position P3 while avoiding the obstacle 303. Even if the second movement route RTP2 interferes with the obstacle 303, the number of times of turning the vehicle 1 rightward and leftward is reduced compared to that in a case where the second movement route RTP2 is set to not avoid the enlarged first virtual obstacle 311 but only the detected portion of the obstacle 303.

The movement route determination unit 144 enlarges the first virtual obstacle 311 the predetermined distance De. In other words, the enlarged distance De of the first virtual obstacle 311 is a constant, and does not change. Accordingly, it is possible to prevent interference between the second movement route RTP2 and the other vehicle 302 by increasing the enlarged distance of the first virtual obstacle 311. Even if the enlarged distance De of the first virtual obstacle 311 is smaller than the undetected portion of the obstacle 303, the number of times of turning the vehicle 1 rightward and leftward is reduced.

In a case where the distance D between the other vehicles 301 and 302 in the lateral direction X is less than the threshold value, the movement route determination unit 144 determines the third movement route RTP3 which avoids the detected portion of the obstacle 303 and leads to the target parking position P3. In other words, in a case where the distance between the other vehicles 301 and 302 is short, the first virtual obstacle 311 is not enlarged. Accordingly, it is possible to prevent interference between the vehicle 1 and the other vehicle 302.

In a case where at least a portion of the vehicle 1 is positioned between the other vehicles 301 and 302, and the distance Di between the position of the vehicle 1 and the position P4, at which the detection unit 141 has detected the obstacle 303, in the forward and rearward direction Z is greater than the threshold value, the movement route determination unit 144 cancels the enlargement of the first virtual obstacle 311. Accordingly, the first virtual obstacle 311, which has been enlarged to a size different from the actual size of the obstacle 303, is prevented from affecting parking assistance. If at least a portion of the vehicle 1 enters an area between the other vehicles 301 and 302, the detection unit 141 more accurately detects the positions of the other vehicles 301 and 302 and the obstacle 303. For this reason, parking assistance is more accurately performed compared to a case in which parking assistance is performed based on the enlarged first virtual obstacle 311.

According to at least one of the aforementioned embodiments, a route determination unit enlarges a first virtual obstacle toward a target position, and determines a second route that avoids the enlarged first virtual obstacle. Accordingly, a vehicle is capable of traveling toward the target position while avoiding a third obstacle.

The embodiment disclosed here does not limit the scope of this disclosure, and is merely an example included in the scope of this disclosure. An embodiment of this disclosure may be configured by making modifications, omissions, and additions to at least a portion of the specific usage, structures, shapes, actions, and effects of the aforementioned embodiment insofar as the modifications, omissions, and additions do not depart from the concept of this disclosure.

A parking assistance device according to an aspect of this disclosure includes an obstacle detection unit; a target position determination unit; and a route determination unit. The obstacle detection unit detects an obstacle. The target position determination unit determines a target position between a first virtual obstacle, which is based on a first obstacle detected by the obstacle detection unit, and a second virtual obstacle which is based on a second obstacle that is detected by the obstacle detection unit and is lined up with the first obstacle in a row in a first direction. The route determination unit determines a first route from the position of a vehicle to the target position when assisting a driver in parking the vehicle in a parking area, and in a case where while the vehicle travels along the determined first route, the obstacle detection unit has detected a third obstacle which is positioned between the first obstacle and the second obstacle and is closer to the first obstacle than the second obstacle, the route determination unit enlarges the first virtual obstacle toward the target position in the first direction, and determines a second route that avoids the enlarged first virtual obstacle and is set from the position of the vehicle to the target position. In this configuration, since the vehicle travels along the second route that is positioned further away from a third obstacle than the first route, the vehicle is capable of traveling toward the target position while avoiding the third obstacle.

In the parking assistance device according to the aspect of this disclosure, in a case where the obstacle detection unit has detected the third obstacle while the vehicle travels along the first route, the route determination unit may enlarge the first virtual obstacle in the first direction from a detected portion of the third obstacle toward the target position, and determine the second route which avoids the enlarged first virtual obstacle and is set from the position of the vehicle to the target position. In this configuration, since the vehicle moves around the third obstacle along a large curve, even if an undetected portion of the third obstacle is larger than a detected portion of the third obstacle in the first direction, the vehicle is capable of traveling toward the target position while avoiding the third obstacle. Even if the second route interferes with the third obstacle, the number of times of turning the vehicle rightward and leftward is reduced compared to that in a case where the second route is set to not avoid the enlarged first virtual obstacle but only the detected portion of the third obstacle.

In the parking assistance device according to the aspect of this disclosure, the route determination unit may enlarge the first virtual obstacle by a predetermined distance toward the target position in the first direction, and determine the second route that avoids the enlarged first virtual obstacle. In this configuration, in other words, an enlarged distance of the first virtual obstacle is a constant, and does not change. Accordingly, it is possible to prevent interference between the second route and the second obstacle by increasing the enlarged distance of the first virtual obstacle. Even if the enlarged distance of the first virtual obstacle is smaller than the undetected portion of the third obstacle, the number of times of turning the vehicle rightward and leftward is reduced.

In the parking assistance device according to the aspect of this disclosure, in a case where a distance between the first obstacle and the second obstacle in the first direction is greater than a threshold value, the route determination unit may determine the second route, and in a case where the distance between the first obstacle and the second obstacle in the first direction is less than the threshold value, the route determination unit may determine a third route which avoids a detected portion of the third obstacle and is set from the position of the vehicle to the target position. In this configuration, in other words, in a case where the distance between the first obstacle and the second obstacle is short, the first virtual obstacle is not enlarged. Accordingly, it is possible to prevent interference between the vehicle and the second obstacle.

In the parking assistance device according to the aspect of this disclosure, in a case where at least a portion of the vehicle is positioned between the first obstacle and the second obstacle, and a distance between a position, at which the obstacle detection unit has detected the third obstacle, and the position of the vehicle in a second direction intersecting the first direction is greater than a threshold value, the route determination unit may cancel enlargement of the first virtual obstacle. In this configuration, the first virtual obstacle, which has been enlarged to a size different from the actual size of the third obstacle, is prevented from affecting parking assistance.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
   an obstacle detection unit that detects an obstacle;
   a target position determination unit that determines a target position between a first virtual obstacle, which is based on a first obstacle detected by the obstacle detection unit, and a second virtual obstacle which is based on a second obstacle that is detected by the obstacle detection unit and is lined up with the first obstacle in a row in a first direction; and
   a route determination unit that determines a first route from the position of a vehicle to the target position when assisting a driver in parking the vehicle in a parking area, and that, in a case where while the vehicle travels along the determined first route, the obstacle detection unit has detected a third obstacle which is positioned between the first obstacle and the second obstacle and is closer to the first obstacle than the second obstacle, enlarges the first virtual obstacle toward the target position in the first direction, and determines a second route that avoids the enlarged first virtual obstacle and is set from the position of the vehicle to the target position.

2. The parking assistance device according to claim 1, wherein in a case where the obstacle detection unit has detected the third obstacle while the vehicle travels along the first route, the route determination unit enlarges the first virtual obstacle in the first direction from a detected portion of the third obstacle toward the target position, and determines the second route which avoids the enlarged first virtual obstacle and is set from the position of the vehicle to the target position.

3. The parking assistance device according to claim 1, wherein the route determination unit enlarges the first virtual obstacle by a predetermined distance toward the target position in the first direction, and determines the second route that avoids the enlarged first virtual obstacle.

4. The parking assistance device according to claim 1, wherein in a case where a distance between the first obstacle and the second obstacle in the first direction is greater than a threshold value, the route determination unit determines the second route, and in a case where the distance between the first obstacle and the second obstacle in the first direction is less than the threshold value, the route determination unit determines a third route which avoids a detected portion of the third obstacle and is set from the position of the vehicle to the target position.

5. The parking assistance device according to claim 1, wherein in a case where at least a portion of the vehicle is positioned between the first obstacle and the second obstacle, and a distance between a position, at which the obstacle detection unit has detected the third obstacle, and the position of the vehicle in a second direction intersecting the first direction is greater than a threshold value, the route determination unit cancels enlargement of the first virtual obstacle.

* * * * *